(12) United States Patent
Jang et al.

(10) Patent No.: US 12,043,707 B2
(45) Date of Patent: Jul. 23, 2024

(54) APPARATUS AND METHOD FOR PRODUCING POLYMER LATEX RESIN POWDER

(71) Applicant: LG Chem, Ltd., Seoul (KR)

(72) Inventors: Jung Kee Jang, Daejeon (KR); Hyun Jin Shin, Daejeon (KR); Ye Hoon Im, Daejeon (KR)

(73) Assignee: LG Chem, Ltd., Seoul (KR)

(*) Notice: Subject to any disclaimer, the term of this patent is extended or adjusted under 35 U.S.C. 154(b) by 1141 days.

(21) Appl. No.: 16/754,950

(22) PCT Filed: Nov. 1, 2018

(86) PCT No.: PCT/KR2018/013144
§ 371 (c)(1),
(2) Date: Apr. 9, 2020

(87) PCT Pub. No.: WO2019/093712
PCT Pub. Date: May 16, 2019

(65) Prior Publication Data
US 2020/0230525 A1 Jul. 23, 2020

(30) Foreign Application Priority Data

Nov. 8, 2017 (KR) .................. 10-2017-0147939
Oct. 26, 2018 (KR) .................. 10-2018-0128632

(51) Int. Cl.
*C08J 3/16* (2006.01)
*B01F 27/191* (2022.01)
(Continued)

(52) U.S. Cl.
CPC .............. *C08J 3/16* (2013.01); *B01F 27/191* (2022.01); *B01F 27/906* (2022.01);
(Continued)

(58) Field of Classification Search
CPC ......................... B01F 33/811; B01F 29/252
See application file for complete search history.

(56) References Cited

U.S. PATENT DOCUMENTS 2,491,519 A 12/1949 Rose et al.
2,495,147 A 1/1950 Street
(Continued)

FOREIGN PATENT DOCUMENTS

CN 1387544 A 12/2002
CN 1473167 A 2/2004
(Continued)

OTHER PUBLICATIONS

Machine translation of JP2006045292 accessed via worldwide.espacenet.com on Sep. 12, 2023.*
Extended European Search Report including Written Opinion for Application No. EP18875077.2, dated Jul. 14, 2020, pp. 1-9.
(Continued)

*Primary Examiner* — Marc C Howell
(74) *Attorney, Agent, or Firm* — Lerner David LLP

(57) ABSTRACT

The present invention relates to an apparatus and a method for producing a polymer latex resin powder, and according to one aspect of the present invention, there is provided an apparatus for producing a polymer latex resin powder comprising a first flocculation tank to which a polymer latex and a flocculant are each supplied, wherein the first flocculation tank is provided with a stirring part including a rotation axis and one or more impellers mounted on the rotation axis, and a discharge line, and the first flocculation tank is configured to operate as a closed system upon operation of the stirring part.

4 Claims, 5 Drawing Sheets

(51) Int. Cl.
  *B01F 27/906* (2022.01)
  *B01F 33/81* (2022.01)
  *B01J 2/10* (2006.01)
  *B01J 19/00* (2006.01)
  *B01J 19/18* (2006.01)

(52) U.S. Cl.
  CPC .............. *B01F 33/811* (2022.01); *B01J 2/10* (2013.01); *B01J 19/0066* (2013.01); *B01J 19/18* (2013.01); *C08J 2321/02* (2013.01)

(56) References Cited

U.S. PATENT DOCUMENTS

| | | | |
|---|---|---|---|
| 2005/0101726 A1* | 5/2005 | Lee | C08C 1/15 |
| | | | 524/800 |
| 2007/0032611 A1 | 2/2007 | Vandaele | |
| 2012/0305468 A1 | 12/2012 | Sato et al. | |
| 2014/0264984 A1 | 9/2014 | Kosvintsev | |

FOREIGN PATENT DOCUMENTS

| | | |
|---|---|---|
| JP | 57098503 A | 6/1982 |
| JP | H0971603 A | 3/1997 |
| JP | 2000239315 A | 9/2000 |
| JP | 2006045292 A | 2/2006 |
| KR | 20030023389 A | 3/2003 |
| KR | 100385725 B1 | 5/2003 |
| KR | 20060034486 A | 4/2006 |
| KR | 20070028321 A | 3/2007 |
| KR | 20100033553 A | 3/2010 |
| KR | 20180023654 A | 3/2018 |
| TW | 200602366 A | 1/2006 |
| WO | 2011122658 A1 | 10/2011 |

OTHER PUBLICATIONS

Chinese Search Report for Application No. 20188006559.6, Dated Jul. 29, 2021, 3 Pages.
International Search Report from Application No. PCT/KR2018/013144 mailed Apr. 4, 2019, 2 pages.

* cited by examiner

[Figure 1]
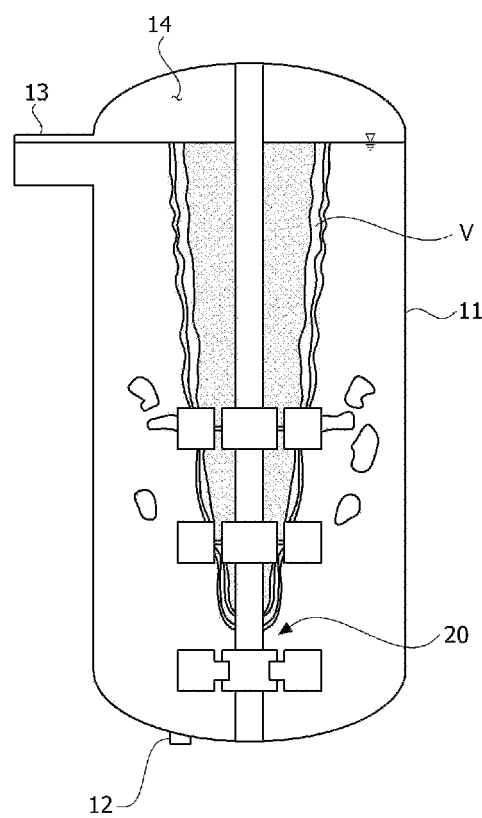

[Figure 2]
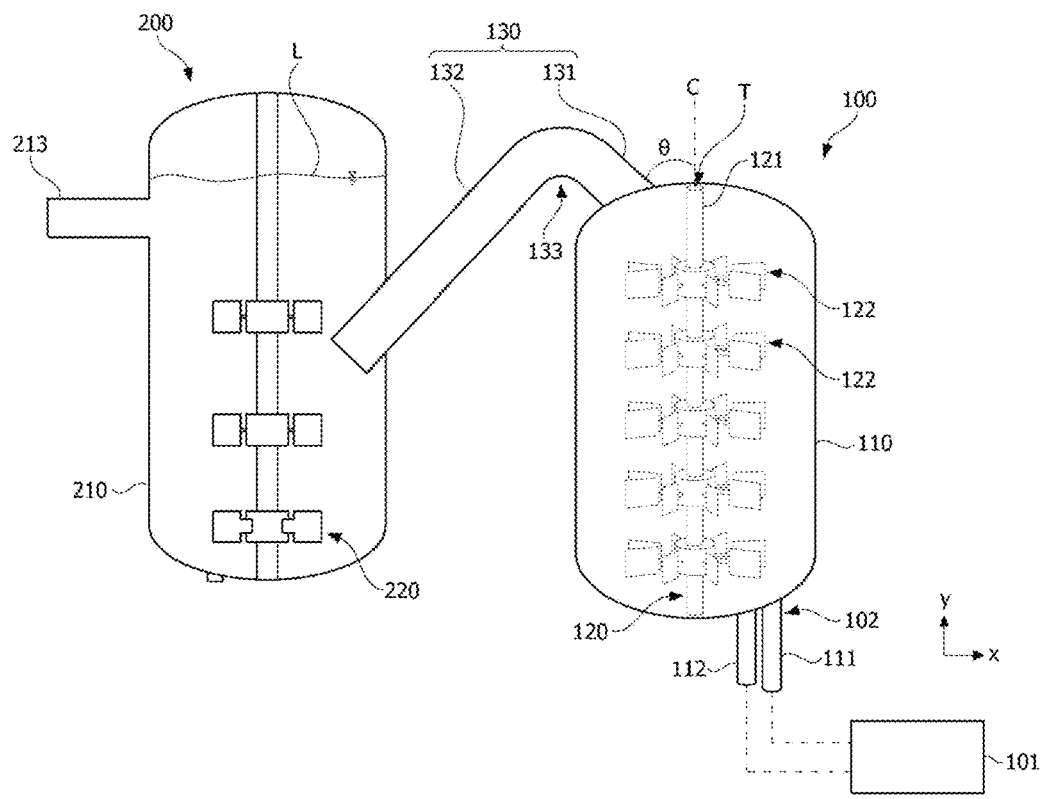

[Figure 3]
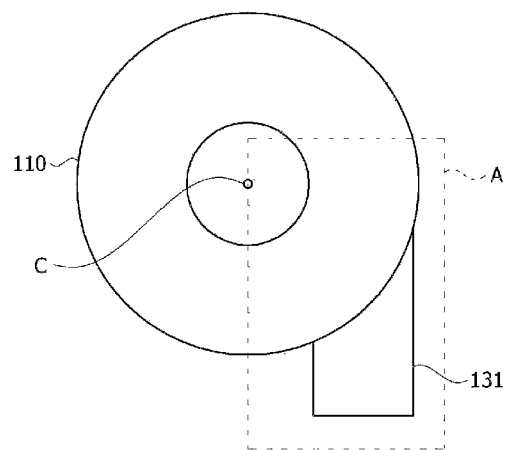
[Figure 4]
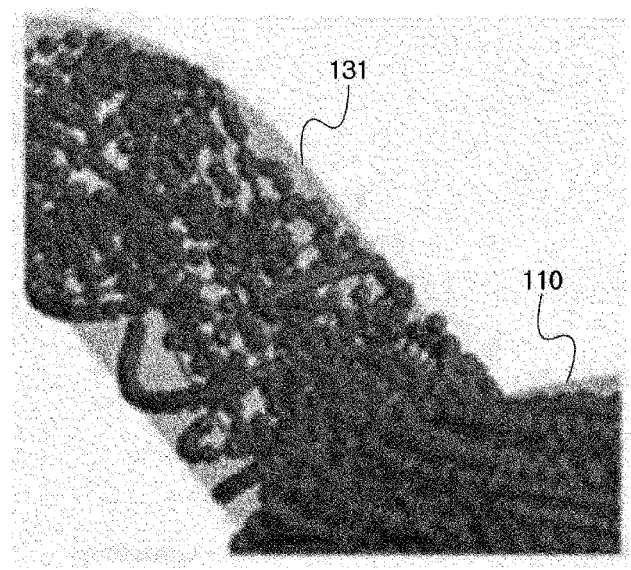

[Figure 5]
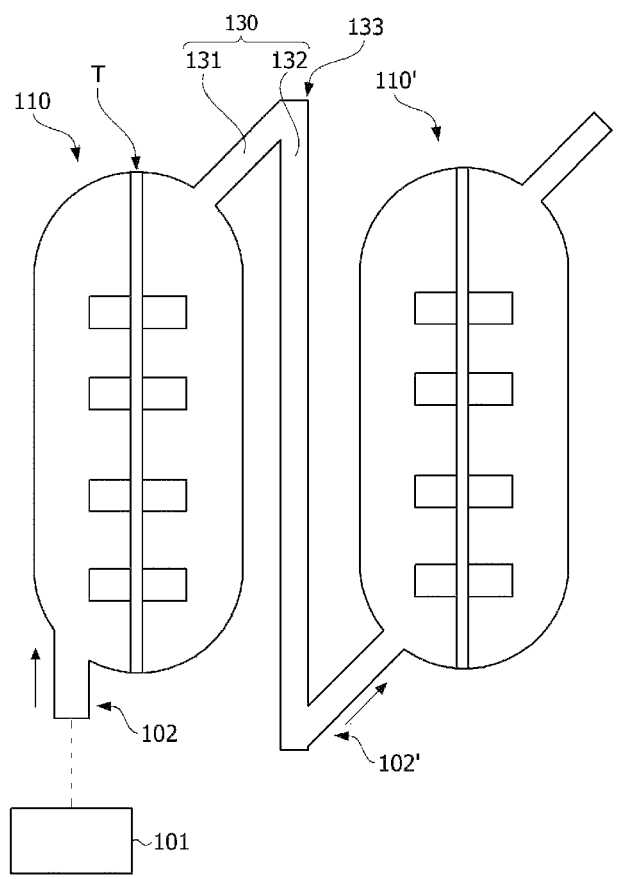

[Figure 6]
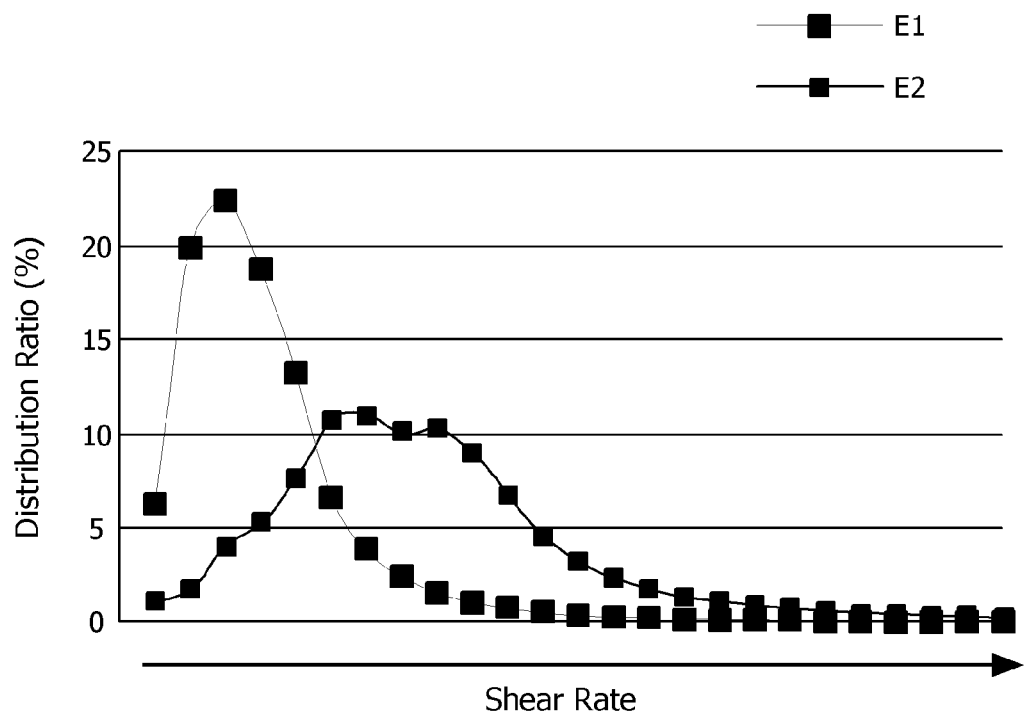

APPARATUS AND METHOD FOR PRODUCING POLYMER LATEX RESIN POWDER

CROSS-REFERENCE TO RELATED APPLICATIONS TECHNICAL-FIELD

The present application is a national phase entry under 35 U.S.C. § 371 of International Application No. PCT/KR2018/013144, filed on Nov. 1, 2018, which claims priority from Korean Patent Application No. 10-2017-0147939, filed on Nov. 8, 2017, and Korean Patent Application No. 10-2018-0128632, filed on Oct. 26, 2018, the disclosures of which are hereby incorporated herein by reference in their entireties. The present invention relates to an apparatus and a method for producing a polymer latex resin powder.

TECHNICAL FIELD

The present invention relates to an apparatus and a method for producing a polymer latex resin powder. This application claims the benefit of priority based on Korean Patent Application No. 10-2017-0147939 filed on Nov. 8, 2017 and Korean Patent Application No. 10-2018-0128632 filed on Oct. 26, 2018, the disclosures of which are incorporated herein by reference in their entirety.

BACKGROUND ART

Generally, slow coagulation is used as a method for preparing a polymer latex as a powder in an emulsion polymerization process, and in this method, an aqueous solution of a flocculant such as an inorganic salt and an acid is divided in small amounts and added to break stability of an emulsifier, whereby the polymer in the latex is agglomerated.

The slow coagulation method is capable of controlling the particle size as compared with a rapid coagulation method. A process of agglomerating polymer particles in the latex is called coagulation and one in which the polymer particles are agglomerated is called a slurry, where they are in a physically weakly bonded state, and thus show an easy break-up phenomenon by shear force by a stirrer (for example, an impeller).

In addition, the primarily coagulated slurry is subjected to an aging process. The slurry thus generated is subjected to dehydrating and drying processes to finally obtain a powdery phase.

Usually, in the polymer latex resin powder, fine particles having an average particle diameter of about 75 μm or less are called "fine" particles and larger particles having an average particle diameter of about 800 μm or more are called "coarse" particles. The fine particles deteriorate the performance of the dehydrator and the dryer of the latex resin powder and are easily scattered into the air, which cause many problems in transport and packing of the powder in the process, and the coarse particles have a problem of transport and storage and have a disadvantage that compatibility with other polymer resins is poor.

FIG. 1 is a conceptual diagram showing a conventional apparatus (10) for producing a polymer latex resin powder.

Referring to FIG. 1, the production apparatus (10) comprises a flocculation tank (11), a plurality of supply lines (12) for supplying a polymer latex, a flocculant and water, and the like into the flocculation tank, a stirring part (20) provided in the flocculation tank (11) and a discharge line (13). Here, the flocculation tank (11) has been provided so as to operate in an open system. Specifically, the flocculation tank (11) is maintained at a predetermined slurry level, and an air layer (14) is formed on the top of the flocculation tank (11).

As described above, when the stirring part (20) is operated in the open system, coarse particles are generated by formation of vortexes (V) around the stirring part (20).

DISCLOSURE

Technical Problem

It is an object of the present invention to provide an apparatus and a method for producing a polymer latex resin powder capable of reducing fine and coarse particles.

It is another object of the present invention to provide an apparatus and a method for producing a polymer latex resin powder capable of applying uniform shear force.

Technical Solution

To solve the above-described objects, according to one aspect of the present invention, there is provided an apparatus for producing a polymer latex resin powder comprising a first flocculation tank to which a polymer latex and a flocculant are each supplied, wherein the first flocculation tank is provided with a stirring part including a rotation axis and one or more impellers mounted on the rotation axis, and a discharge line, respectively and the first flocculation tank is provided so as to operate in a closed system upon operating the stirring part.

The discharge line is connected to the top region of the first flocculation tank, whereby the first flocculation tank is provided so as to operate in a closed system upon operating the stirring part.

Also, the discharge line is connected along the tangential direction to the first flocculation tank.

Furthermore, the discharge line is connected to the first flocculation tank so as to be inclined at a predetermined angle based on the rotation axis of the stirring part. In addition, the angle may be 45°.

Also, first and second supply lines, to which the polymer latex and the flocculant are each supplied, may be connected to the first flocculation tank.

Furthermore, the first and second supply lines may be each connected to the bottom region of the first flocculation tank and may be provided so that the polymer latex and the flocculant are each supplied to the end side of the impeller.

In addition, the apparatus for producing a polymer latex resin powder may further comprise a second flocculation tank into which the polymer slurry discharged from the first flocculation tank flows.

At this time, the discharge line may be connected to the second flocculation tank at a height lower than the slurry level of the second flocculation tank.

Also, the discharge line may comprise a first region connected to the first flocculation tank and a second region connected to the second flocculation tank.

Furthermore, the boundary between the first region and the second region may be located above the uppermost end of the first flocculation tank.

In addition, the first region and the second region of the discharge line may be connected at a predetermined angle.

Also, it is preferable that both the first flocculation tank and the discharge line are each filled with the polymer slurry upon operating the stirring part.

In addition, according to another aspect of the present invention, there is provided a method for producing a polymer latex resin powder, comprising steps of supplying a polymer latex and a flocculant to a first flocculation tank, stirring the polymer latex and flocculant in the first flocculation tank in a closed system and supplying the polymer slurry in the first flocculation tank into a second flocculation tank.

Advantageous Effects

As described above, the apparatus and method for producing a polymer latex resin powder related to at least one example of the present invention have the following effects.

As the flocculation tank is provided so as to operate in a closed system upon stirring the polymer slurry, the fine and coarse particles can be reduced and the uniform shear force can be applied to the polymer slurry through the stirring part.

BRIEF DESCRIPTION OF DRAWINGS

FIG. 1 is a conceptual diagram showing a conventional apparatus for producing a polymer latex resin powder.

FIG. 2 is a conceptual diagram showing an apparatus for producing a polymer latex resin powder related to one example of the present invention.

FIG. 3 is a diagram for explaining a connection structure of a discharge line.

FIG. 4 shows an analysis result of Area A in FIG. 3.

FIG. 5 is a conceptual diagram showing an apparatus for producing a polymer latex resin powder related to another example of the present invention.

FIG. 6 is a graph showing the distribution ratio of the shear rate.

MODE FOR INVENTION

Hereinafter, an apparatus and a method for producing a polymer latex resin powder according to one example of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

FIG. 2 is a conceptual diagram showing an apparatus (100) for producing a polymer latex resin powder (hereinafter, also referred to as a 'production apparatus') related to one example of the present invention.

Also, FIG. 3 is a diagram for explaining a connection structure of a discharge line, and FIG. 4 is an analysis result of Area A in FIG. 3.

The production apparatus (100) comprises a first flocculation tank (110), a plurality of supply lines (111, 112), a stirring part (120) and a discharge line (130).

Specifically, the production apparatus (100) comprises a first flocculation tank (110) to which a polymer latex and a flocculant are each supplied. Also, the first flocculation tank (110) is provided with a stirring part (120) including a rotation axis (121) and one or more impellers (122) mounted on the rotation axis (121), and a discharge line (130), respectively. In addition, the first flocculation tank (110) is provided so as to operate in a closed system when the stirring part (120) is operated. The first flocculation tank (110) may be composed of a flocculation tank operated in a closed system. The symbol C denotes the central axis of the first flocculation tank (110).

In this document, the fact that the first flocculation tank (110) operates in a closed system means that the first flocculation tank (110) and the discharge line (130) are fully filled with the polymer slurry upon operating the stirring part (120). For example, the fact that the first flocculation tank (110) operates in a closed system may also mean that 90% or more of the volume of the first flocculation tank (110) is filled with the polymer slurry, preferably, may also mean that 95% or more of the volume of the first flocculation tank (110) is filled with the polymer slurry, and more preferably, may mean that 100% of the volume of the first flocculation tank (110) is filled with the polymer slurry.

In addition, in the first flocculation tank (110), a supply part (102) may be provided in the bottom region. Specifically, in the first flocculation tank (110), a first and second supply lines (111, 112), to which a polymer latex and a flocculant are each supplied, may be connected to the bottom region. Each of the supply lines (111, 112) may be connected to one or more supply sources (101). The supply source may comprise, for example, a latex tank. Furthermore, water or the like may be further supplied to the first flocculation tank (110).

On the other hand, the first and second supply lines (111, 112) may be connected to the bottom region of the first flocculation tank (110), respectively. Also, the first and second supply lines (111, 112) may be connected to the bottom region of the first flocculation tank (110) in parallel to the axial direction of the rotation axis (121), respectively. Furthermore, the first and second supply lines (111, 112) may be provided so that the polymer latex and the flocculant are each supplied to the end side of the impeller (122) (the impeller positioned at the bottom region of the first flocculation tank).

The discharge line (130) is connected to the top region of the first flocculation tank (110). The discharge line (130) is connected to the top region of the first flocculation tank (110), whereby the first flocculation tank (110) can easily operate in a closed system.

Also, the discharge line (130) of the first flocculation tank (110) may comprise a first region (131) connected to the first flocculation tank (110) and a second region (132) connected to the second flocculation tank (200). At this time, the first region (131) and the second region (132) may be connected at a predetermined angle.

In addition, the boundary (133, connection) between the first region and the second region is located above the uppermost end (T) of the first flocculation tank (110). In this document, the boundary (133) between the first region and the second region is located above the uppermost end (T) of the first flocculating tank (110) based on the central axis (C) direction (y-axis direction) of the first flocculation tank. In this structure, when the first region (131) of the discharge line (130) is filled with the polymer slurry, 90% or more of the volume of the first flocculation tank (110) may be filled with the polymer slurry, preferably, 95% or more of the volume of the first flocculation tank (110) may be filled with the polymer slurry, and more preferably, 100% of the first flocculation tank (110) may be filled with the polymer slurry.

Referring to FIG. 3, the discharge line (130) is connected to the first flocculation tank (110) along the tangential direction. The first flocculation tank (110) may be in the form of a cylindrical cylinder. The first flocculation tank (110) may have a circular cross-section shape parallel to the x-axis direction in FIG. 2. In this structure, the first region (131) is connected to the first flocculation tank (110) along the tangential direction. The tangential direction means that it is connected to the tangential direction of the first flocculation tank (110) based on the center axis (C) of the first flocculation tank (110).

Also, the discharge line (130) is connected to the first flocculation tank (110) so as to be inclined at a predetermined angle based on the rotation axis (121) of the stirring part (120) (or the central axis of the first flocculation tank). Specifically, the first region (131) is connected to the first flocculation tank (110) so as to be inclined at a predetermined angle based on the rotation axis (121) of the stirring part (120) (or the central axis of the first flocculation tank).

Furthermore, it is preferable that the angle (θ) is about 45° so that the flow of the polymer slurry can be performed in a state where the polymer slurry is filled in the discharge line (130). In addition, when the discharge line (130) is connected to the first flocculation tank (110) in a state of being inclined at a predetermined angle, the outlet flow rate can be maintained constant.

In addition, the production apparatus (100) may further comprise a second flocculation tank (200) into which the polymer slurry discharged from the first flocculation tank (110) flows.

At this time, the second flocculation tank (200) may have the general flocculation tank structure described through FIG. 1. For example, the second flocculation tank (200) may comprise a housing (210) providing a stirring space, a stirring part (220) provided in the housing (210) and a discharge line (213) connected to the housing (210). In addition, the second flocculation tank (200) may be provided so as to operate in an open system.

On the other hand, the discharge line (130) of the first flocculation tank (110) may be connected at a height lower than the slurry level (L) of the second flocculation tank (200).

In such a structure, the first flocculation tank (110) and the discharge line (130) may be fully filled with the polymer slurry when the stirring part (120) is operated.

FIG. 5 is a conceptual diagram showing an apparatus for producing a polymer latex resin powder related to another example of the present invention.

Referring to FIG. 5, the apparatus for producing a polymer latex resin powder may comprise a plurality of first flocculation tanks (110, 110'). Also, two adjacent first flocculation tanks (110, 110') may be connected together to form a closed system.

For example, the discharge line (130) of the first flocculation tank (110) connected to the supply source (101) is connected to the supply part (102') of the adjacent first flocculation tank (110'). At this time, in the discharge line (130) of the first flocculation tank (100) connected to the supply source (101), the first region (131) is drawn out from the top region of the first flocculation tank (110), and the second region (132) is connected to the supply part (102') of the bottom region of the adjacent first flocculation tank (110').

A method for producing a polymer latex resin powder (hereinafter, also referred to as a 'production method') using the production apparatus (100) having such a structure will be described in detail.

The production method comprises steps of supplying a polymer latex and a flocculant to a first flocculation tank (110), respectively, stirring the polymer latex and the flocculant in the first flocculation tank (110) in a closed system, and supplying the polymer slurry in the first flocculation tank to a second flocculation tank (200).

Also, it is preferable that the polymer slurry in the first flocculation tank (110) is supplied at a height lower than the slurry level (L) of the second flocculation tank (200).

In addition, it is preferable that the first flocculation tank (110) is filled with the polymer slurry at the time of stirring.

FIG. 6 is a graph showing the distribution ratio of the shear rate.

Referring to FIG. 6, a reference symbol E1 denotes existing coagulation, and a reference symbol E2 denotes new coagulation. At this time, the 'existing coagulation' represents the distribution ratio of the shear rate in the flocculation tank operating in the open system described in FIG. 1, and the 'new coagulation' is the result using the production apparatus related to the present invention, which represents the distribution ratio of the shear rate in the flocculation tank operating in the closed system, and it can be confirmed that the distribution ratio of the shear rate is uniformly formed when the flocculation tank is operated in the closed system.

The preferred examples of the present invention as described above are disclosed for illustrative purposes, which can be modified, changed and added within thought and scope of the present invention by those skilled in the art and it will be considered that such modification, change and addition fall within the following claims.

INDUSTRIAL APPLICABILITY

According to the apparatus and method for producing a polymer latex resin powder related to at least one example of the present invention, as the flocculation tank is provided so as to operate in a closed system upon stirring the polymer slurry, the fine and coarse particles can be reduced and the uniform shear force can be applied to the polymer slurry through the stirring part.

The invention claimed is:
1. An apparatus for producing a polymer latex resin powder, the apparatus comprising:
   a first flocculation tank configured to receive a polymer latex and a flocculant;
   a second flocculation tank configured to receive a polymer slurry discharged from the first flocculation tank;
   a stirring part disposed in the first flocculation tank, the stirring part including a shaft extending along a rotation axis of the stirring part and one or more impellers mounted on the shaft; and
   a discharge line connected to a top region of the first flocculation tank, the discharge line comprising a first region connected to the first flocculation tank and a second region connected to the second flocculation tank, the first region and the second region being connected at a first predetermined angle relative to one another, a boundary at which the first region connects with the second region being located above an uppermost end of the first flocculation tank,
   wherein the first flocculation tank is configured to operate as a closed system upon operation of the stirring part, the closed system meaning that 90% or more of a volume of the first flocculation tank is configured to be filled with the polymer slurry, and
   the discharge line extends away from the first flocculation tank along a tangential direction relative to the rotation axis of the stirring part, and the discharge line is inclined at a second predetermined angle of about 45 degrees relative to the rotation axis of the stirring part, such that the discharge line is geometrically configured to maintain a constant outlet flow rate of the polymer slurry.

2. The apparatus according to claim 1, further comprising first and second supply lines configured to receive the polymer latex and the flocculant therethrough,
wherein the first and second supply lines are each connected to a bottom region of the first flocculation tank opposite from the top region, the first and second supply lines being configured to supply the polymer latex and the flocculant to a bottom end of the impeller disposed in the bottom region.

3. The apparatus according to claim 1,
wherein the discharge line is connected to the second flocculation tank at a first height above a bottom of the second flocculation tank that is lower than a second height above the bottom of the second flocculation tank of an anticipated slurry level of the second flocculation tank.

4. The apparatus according to claim 3, wherein both the first flocculation tank and the discharge line are configured to be filled with the polymer slurry upon operation of the stirring part.

* * * * *